United States Patent Office 3,459,685
Patented Aug. 5, 1969

3,459,685
POLYMERIZATION OF CYCLIC ALKYLENE OXIDES WITH CATALYST SYSTEMS OF A POLYMERIC ALUMINUM ALCOHOLATE AND AN ORGANOMETALLIC
Hideo Tomomatsu, Austin, Tex., assignor to Jefferson Chemical Company, Inc., Houston, Tex., a corporation of Delaware
No Drawing. Filed Mar. 28, 1967, Ser. No. 626,391
Int. Cl. C08g 23/06, 23/14
U.S. Cl. 260—2                 8 Claims

ABSTRACT OF THE DISCLOSURE

High molecular weight polymers having a high degree of crystallinity are obtained from the polymerization of cyclic ethylene and propylene oxides employing a binary catalyst system of an organometallic compound of dialkyl zinc or trialkyl aluminum and a polymeric aluminum alcoholate having the formula:

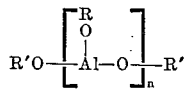

Cyclic ethylene and propylene oxides employed are those containing oxygen-carbon rings consisting of one oxygen atom in a ring with two or three carbon atoms.

BACKGROUND OF THE INVENTION

This invention is concerned with the polymerization of cyclic alkylene oxides using a binary catalyst system of an organometallic compound and a polymeric aluminum alcoholate.

The polymerization of alkylene oxides is well known. For many years low molecular weight polymers have been obtained by the polymerization of alkylene oxides in the presence of alkaline catalysts. More recently, efforts have been made to obtain tough, solid polymeric alkylene oxides having molecular weights of one million or more.

When alkylene oxides having side chains, such as propylene oxide and epichlorohydrin, are employed, the polymerization may yield both stereoregular and stereoirregular polymers, depending mainly on the polymerization catalyst employed. Stereoregular polymers are crystalline, while stereoirregular polymers are amorphous. For some purposes, crystalline polymers are more desirable. Thus, at times it is important not only to obtain polymers of extremely high molecular weights but also to obtain polymers containing a high percentage of stereoregular polymer.

Compounds of the type employed as the two components of my catalyst system have been reported to have some catalytic activity in the polymerization of oxides when used separately (J. Furukawa and T. Saegusa, Polymerization of Aldehydes and Oxides, Interscience Publishers, New York (1963)). However, it was entirely unexpected that by mixing the two components a high yield of high molecular weight polymer containing a high percentage of stereoregular polymer could be obtained.

SUMMARY OF THE INVENTION

I have now developed a method for the polymerization of cyclic alkylene oxides whereby high molecular weight polymers havnig a high degree of crystallinity may be obtained. In accordance with my method a binary catalyst system of a polymeric aluminum alcoholate and an organo-metallic compound as defined hereinbelow is employed.

DESCRIPTION OF THE PREFERRED EMBODIMENT

Polymeric aluminum alcoholates for use in my invention may be represented by the formula:

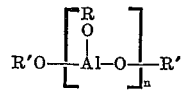

wherein R is an aliphatic, cycloaliphatic or aromatic hydrocarbon radical containing from 1 to 18 carbon atoms, R' is hydrogen or R, and $n$ is at least 2. For example, R may be ethyl, isopropyl, butyl, cyclohexyl, nonyl, octadecyl, benzyl, phenyl and naphthyl. The degree of polymerization of such products is at least 2 and may be 50 to 100 or higher. Methods for the preparation of such polymers are known, and the particular way in which the polymer is prepared is immaterial insofar as my invention is concerned. Their preparation is described, for example, by Andrianov, Metallorganic Polymers, Interscience Publishers, New York (1965), p. 327. A particularly preferred polymeric aluminum alcoholate is that prepared from aluminum isopropoxide.

The organometallic compound to be used in conjunction with the polymeric aluminum alcoholate is defined as one having the formula $MZX_{y-1}$ wherein M is a metal belonging to Groups II and III, and preferably Groups IIB and IIIA, of the Periodic Table, Z is a member selected from the group consisting of alkyl and aryl groups containing from 1 to 18 carbon atoms, X is selected from the class consisting of hydrogen, halogen, Z and alkoxy and aryloxy groups containing 1 to 18 carbon atoms, and $y$ is a whole number equal to the valence of M. This metallic compound will contain at least one alkyl or aryl group and may contain additional such groups or alkoxy, aryloxy, hydrogen or a halogen such as chlorine, bromine, or iodine. Examples of M include magnesium, calcium, strontium, barium, zinc, cadmium and aluminum. Typical examples of Z include methyl, ethyl, phenyl, butyl, hexyl, cyclobutyl, cyclohexyl, tolyl, ethoxy, propoxy, butoxy and phenoxy. Z is preferably an alkyl group. Especially preferred organometallic compounds are diethyl zinc and triethyl aluminum. Other acceptable compounds include diethyl aluminum hydride, ethyl aluminum dichloride, diphenyl zinc, methyl zinc phenoxide, dilauryl cadmium, triethyl gallium, phenyl cyclohexyl beryllium and dibenzyl cadmium.

The cyclic alkylene oxides that may be polymerized by my process are those containing oxygen-carbon rings in which one oxygen atom is combined with two or three carbon atoms in the ring. The ring carbon atoms may be substituted with alkyl, aryl, cycloalkyl, alkoxyl and haloalkyl groups. The most common cyclic alkylene oxides are those containing the three membered oxirane ring. Examples of such oxides include ethylene oxide, 1,2-propylene oxide, 1,2-butylene oxide, 2,3-butylene oxide, 1,2-dodecene oxide, styrene oxide, epichlorohydrin and allyl glyucidyl ether. A typical four-membered alkylene oxide is 1,3-propylene oxide, commonly referred to as oxetane. Other such cyclic oxides include 3,3-dimethyloxetane, 3,3-diethyloxetane and 3,3-di(chloromethyl)-oxetane.

The concentration of the mixed catalyst may be varied from 1 to 20 wt. percent or higher based on the weight of the monomeric oxide. It is preferred to use from about 5 to 10 wt. percent catalyst. The weight ratio of polymeric aluminum alcoholate to metallic compound in the catalyst may be varied from about 10:1 to 1:10 with the preferred ratio being from about 1:2 to 2:1 with a ratio of about 1:1 being particularly preferred.

The polymerization may be run at a temperature within the range of 0° to 200° C.; however, it is preferred to employ temperatures within the range of about 25° to about 150° C. To avoid loss of volatile components, the reaction is normally conducted in a closed vessel. The particular pressure at which the reaction is conducted is not critical, and ambient pressures are generally employed.

The polymerization reaction should be conducted in a dry, inert atmosphere. A dry, inert solvent is employed. The solvent may be an aliphatic or aromatic hydrocarbon or an ether. Typical solvents include cyclohexane, n-hexane, petroleum ether, pentane, heptane, benzene, toluene, diethyl ether and dipropyl ether.

After the polymerization is complete the catalyst may be quenched by the addition of a suitable amount of a lower aliphatic alcohol, preferably isopropyl alcohol, in solution in an inert solvent as described above. Generally, sufficient alcohol is used to react with both components of the catalyst system. The presence of the quenched catalyst in the polymer does not adversely affect the polymer properties. It is also possible to add a small amount of antioxidant (usually 0.3 to 3.0 wt. percent based on the monomeric oxide) in solution in a solvent to increase the stability of the polymer.

To demonstrate the unexpected synergistic effect shown by my two-component catalyst system, propylene oxide was polymerized using polymeric aluminum isopropoxide alone, diethyl zinc alone, triethyl aluminum alone and combinations of polymeric aluminum isopropoxide with diethyl zinc and with triethyl aluminum. These polymerizations were conducted in cyclohexane solvent at 80° C. for a period of 24 hours. The results of these experiments are summarized in Table 1. The intrinsic viscosity of the polymers was observed in toluene at 25° C. Fractionation of the polymer to determine the crystalline content was carried out by dissolving the polymer in sixty times its weight of acetone and precipitating the crystalline fraction by cooling the solution to −45° C.

to be more effective in polymerizing other oxides such as, for example, epichlorohydrin as in Example VII.

Binary catalyst systems of diethyl zinc and activated alumina and diethyl zinc and aluminum isopropoxide monomer have also been previously reported. However, the results obtained using these previously reported binary systems are greatly inferior to the results obtained using the binary systems of the present invention. For example, when 4.3% activated alumina and 5% diethyl zinc were employed under the conditions of the runs reported in Table 1, the total yield of polymer was only 20%. Using 4.3% aluminum isopropoxide monomer and 3.8 diethyl zinc under the same conditions gave a total yield of polymer of only 8.8%.

My invention will be further illustrated by the following examples.

EXAMPLE I

Polymeric aluminum isopropoxide (2.15 grams) was placed in a 1,000 ml. Pyrex glass pressure bottle under dry nitrogen. To this was added 450 grams of freshly distilled, dried cyclohexane and the mixture was stirred under airtight conditions to a slightly turbid mixture. A 25% solution of diethyl zinc in heptane (10 grams) was added, and after complete mixing 50 grams of freshly distilled propylene oxide was added.

The pressure bottle was closed by a stainless steel cap equipped with a Teflon O-ring and was subjected to shaking in an oil bath at 80° C. for 24 hours. At the end of this time the reaction mixture was a slightly yellow, partially foamed, transparent, rubbery semisolid. The reaction mixture was mixed with 50 ml. of cyclohexane which contained 0.25 grams of isopropyl alcohol and 0.25 grams of dibutyl-para-cresol. After this mixture had been left standing for several hours, it was poured on aluminum foil to allow the solvent to evaporate. In this way there was obtained 51 grams of a slightly yellow, very tough, nonsticky, rubbery material. The intrinsic viscosity of the polymer determined in toluene at 25° C. was 10.6. The molecular weight calculated from the intrinsic viscosity was 3,600,000. The polymer was fractionated into crystalline and noncrystalline fractions on the basis of solubility in cold acetone. The insoluble, or crystalline, fraction comprised 89% of the total. The

TABLE 1

| Run No. | Catalyst Compound | Conc. based on propylene oxide, percent | Total polymer Yield, percent | Intrinsic viscosity | Avg. mol. wt. | Crystalline fraction, percent |
|---|---|---|---|---|---|---|
| 1 | Polymeric aluminum isopropoxide | 4.3 | 100 | 0.25 | 25,000 | 26.8 |
| 2 | Diethyl zinc | 5 | 0 | | | 0 |
| 3 | Polymeric aluminum isopropoxide plus diethyl zinc. | 4.3+5.0 | 100 | 10.6 | 3,600,000 | 89 |
| 4 | Triethyl aluminum | 2.96 | 22 | 0.38 | 41,700 | 14 |
| 5 | Polymeric aluminum isopropoxide plus triethyl aluminum. | 5.38+2.96 | 80 | 5.2 | 1,380,000 | 49 |

While the use of polymeric aluminum isopropoxide resulted in a 100% yield of polymer, it is to be noted that the average molecular weight of the polymer was relatively low and the amount of crystalline polymer present was also low. In view of the fact that diethyl zinc alone gave no polymer, it was entirely unexpected that the combination of polymeric aluminum isopropoxide and diethyl zinc would give a 100% yield of a polymer having a molecular weight in excess of 3,000,000 and containing 89% crystalline material. The results using polymeric aluminum isopropoxide and triethyl aluminum, while not as striking as those obtained with diethyl zinc, are nonetheless entirely unexpected in regard to the high molecular weight of the polymer obtained and the amount of crystalline polymer present. Too, this system has been found crystallinity of the polymer was observed by the use of a polarized microscope.

EXAMPLE II

Example I was repeated using 50 grams of ethylene oxide instead of propylene oxide. After evaporation of the solvent there remained 51 grams of a white, slightly elastic, water soluble, solid polymer. This polymer had an intrinsic viscosity of 1.85 in water at 25° C.

EXAMPLE III

Example I was repeated except that 3.83 grams of the 25% diethyl zinc solution in heptane and 50 grams of allyl glycidyl ether rather than 50 grams of propylene oxide were employed. After evaporation of the solvent there was obtained 31 grams of an extremely elastic, slightly brown, rubbery, high polymer.

EXAMPLE IV

A copolymer of allyl glycidyl ether and propylene oxide was prepared using 3.28 grams of allyl glycidyl ether and 40 grams of propylene oxide with 2.15 grams of polymeric aluminum isopropoxide and 7.66 grams of the 25% solution of diethyl zinc in heptane following the procedure of Example I. After evaporation of the solvent, 41.3 grams of a pale yellow, elastic, rubbery material was obtained.

EXAMPLE V

Polymeric aluminum isopropoxide (1.07 grams) was placed in a pressure bottle and to this was added 250 ml. of dried cyclohexane. The mixture was stirred by a magnetic stirrer under airtight conditions, 5 grams of 25% diethyl zinc solution in hexane was added, and the mixture was stirred for several minutes. To the mixture was then added 25 grams of 1,3-propylene oxide (oxetane, trimethylene oxide), and the reaction vessel was closed and subjected to shaking for 36 days at 80° C. The product was worked up following the procedure of Example I. After evaporation of the solvent there was obtained 16 grams (64%) of a nonsticky, white, rubbery polymer.

EXAMPLE VI

Polymeric aluminum isopropoxide (2.69 grams) was placed in a 1,000 ml. Pyrex glass pressure bottle under dry nitrogen atmosphere. To this was added 200 grams of freshly distilled dried cyclohexane and the mixture was stirred under airtight conditions to a slightly turbid mixture. A 20% solution of triethyl aluminum in heptane (7.4 grams) was added and stirring was continued. After completion of mixing, 50 grams of freshly distilled propylene oxide was added. The pressure bottle was closed by means of a stainless steel cap equipped with a Teflon O-ring and subjected to shaking in an oil bath at 80° C. for 24 hours. The product was then worked up as in Example I. After evaporation of the solvent there was obtained 42 grams of a pale yellow, tough, rubbery material, the crystallinity of which was observed by means of a polarized microscope. The intrinsic viscosity of the polymer was 5.2 in toluene at 25° C. The average molecular weight calculated from the intrinsic viscosity was 1,380,000.

EXAMPLE VII

Polymeric aluminum isopropoxide (4.28 grams) was dissolved in 200 ml. of dry benzene in a pressure bottle and to this solution was added 14.8 grams of a 20% solution of triethyl aluminum in toluene. The mixture was stirred by a magnetic stirrer for several minutes and 50 grams of epichlorohydrin which had been dried over a molecular sieve and distilled was added. The pressure bottle was closed and subjected to shaking at 80° C. for 24 hours. The highly viscous mixture was dried to give 55.9 grams (100% yield) of a nonsticky, pale yellow, tough solid. The reduced specific viscosity of this polymer in 0.1% concentration in alphachloronaphthalene at 100° C. was 2.21. The polymer was observed to be crystalline by means of a polarized microscope.

EXAMPLE VIII

Following the procedure of Example VII a mixture of 25 grams of epichlorohydrin and 25 grams of ethylene oxide was copolymerized to 41 grams (80% yield) of a nonsticky, pale yellow, tough solid. This polymer was also observed to be crystalline by use of a polarized microscope.

I claim:

1. A method for the polymerization of a cyclic alkylene oxide having an oxygen-carbon ring in which the oxygen atom is joined with 2 to 3 carbon atoms in the ring, which comprises mixing said oxide at 0° to 200° C. in a closed vessel and in a dry, inert atmosphere with from 1 to 20 wt. percent based on the weight of oxide of a binary catalyst system of
(A) a polymeric aluminum alcoholate represented by the formula:

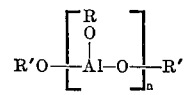

wherein R is an aliphatic, cycloaliphatic or aromatic hydrocarbon radical containing 1 to 18 carbon atoms, R' is hydrogen or R, and $n$ is at least 2 with
(B) an organometallic compound having the formula

wherein M is a metal from Groups II or III of the Periodic Table, Z is an aryl or alkyl group containing from 1 to 18 carbon atoms, X is hydrogen, halogen, Z or an alkoxy or aryloxy group containing 1 to 18 carbon atoms, and $y$ is an integer equal to the valence of M, the weight ratio of compound (A) to compound (B) in the catalyst mixture being within the range of from 10:1 to 1:10.

2. A method as in claim 1 wherein M is a metal from Groups IIB and IIIA of the Periodic Table.

3. A method as in claim 2 wherein the temperature is within the range of 25° to 150° C. and the catalyst concentration is within the range of 5 to 10 wt. percent based on the weight of oxide and the weight ratio of compound (A) to compound (B) is within the range of 2:1 to 1:2.

4. A method as in claim 2 wherein Z is an alkyl group containing 1 to 18 carbon atoms.

5. A method as in claim 4 wherein compound (A) is polymeric aluminum isopropoxide and compound (B) is diethyl zinc.

6. A method as in claim 5 wherein the temperature is within the range of 25° to 150° C., the concentration of the catalyst mixture is between 5 to 10 wt. percent based on the weight of oxide and the weight ratio of polymeric aluminum isopropoxide to diethyl zinc is between 2:1 and 1:2.

7. A method as in claim 4 wherein compound (A) is polymeric aluminum isopropoxide and compound (B) is triethyl aluminum.

8. A method as in claim 7 wherein the temperature is within the range of 25° to 150° C., the catalyst concentration is between 5 to 10 wt. percent based on the weight of oxide and the weight ratio of polymeric aluminum isopropoxide to triethyl aluminum is between 2:1 and 1:2.

References Cited

UNITED STATES PATENTS 2,870,100   1/1959   Stewart et al.
3,345,347   10/1967  Elfers et al. _____ 260—79.5

OTHER REFERENCES

Chemical Abstracts, vol. 65, August 1966, p. 7305g.
Polymerization of Aldehydes and Oxides, Furukawa et al. (pp. 187–193 relied on), 1963.

WILLIAM H. SHORT, Primary Examiner

T. PERTILLA, Assistant Examiner

U.S. Cl. X.R.

260—88